United States Patent
Green et al.

(10) Patent No.: US 12,552,427 B2
(45) Date of Patent: Feb. 17, 2026

(54) SYSTEM AND METHOD TO SUPERVISE VEHICLE POSITIONING INTEGRITY

(71) Applicant: Hitachi Rail GTS Canada Inc., Toronto (CA)

(72) Inventors: Alon Green, Toronto (CA); James Kevin Tobin, Toronto (CA); Andrew Batchelor, Toronto (CA); Veronica Marin, Toronto (CA); Bill (Jinbiao) Ning, Markham (CA)

(73) Assignee: Hitachi Rail GTS Canada Inc., Toronto (CA)

(*) Notice: Subject to any disclaimer, the term of this patent is extended or adjusted under 35 U.S.C. 154(b) by 837 days.

(21) Appl. No.: 17/117,751

(22) Filed: Dec. 10, 2020

(65) Prior Publication Data

US 2021/0171078 A1  Jun. 10, 2021

Related U.S. Application Data

(60) Provisional application No. 62/946,024, filed on Dec. 10, 2019.

(51) Int. Cl.
*B61L 25/02* (2006.01)
*G01S 13/06* (2006.01)

(52) U.S. Cl.
CPC ........... *B61L 25/021* (2013.01); *B61L 25/023* (2013.01); *B61L 25/026* (2013.01); *G01S 13/06* (2013.01)

(58) Field of Classification Search
CPC .... B61L 25/021; B61L 25/023; B61L 25/026; G01S 13/06

(Continued)

(56) References Cited

U.S. PATENT DOCUMENTS 5,986,547 A * 11/1999 Korver ............... G01S 5/0247
                                                    701/19
6,826,478 B2   11/2004 Riewe et al.
(Continued)

FOREIGN PATENT DOCUMENTS

CN    110203254 A   9/2019
DE   102018115978 B3  12/2018
(Continued)

OTHER PUBLICATIONS

J. Liu, B.-g. Cai, T. Tang and J. Wang, "A CKF based GNSS/INS train integrated positioning method," 2010 IEEE International Conference on Mechatronics and Automation, Xi'an, China, 2010, pp. 1686-1689, doi: 10.1109/ICMA.2010.5588839. (Year: 2010).*

(Continued)

*Primary Examiner* — Helal A Algahaim
*Assistant Examiner* — Merritt E Levy
(74) *Attorney, Agent, or Firm* — Studebaker Brackett PLLC

(57) ABSTRACT

A system and method of supervising vehicle positioning of a vehicle along a guideway where the vehicle comprising a supervisory controller, at least two controllers communicatively connected with the supervisory controller, an inertial measurement unit (IMU) and a speed measurement sensor includes receiving, by the controllers, speed measurements from the speed measurement sensor and motion measurements from the inertial measurement unit. The two controllers each estimate the along-track position of the vehicle using a track constrained UKF function based on the received speed measurements and motion measurements. The system executes protection level and protection level supervision functions on the supervisory controller to validate the along-track position estimates. The protection level (Continued)

supervision function uses a Stanford diagram verification technique.

20 Claims, 10 Drawing Sheets

(58) Field of Classification Search
USPC .......................................................... 701/19
See application file for complete search history.

(56) References Cited

U.S. PATENT DOCUMENTS

| | | | |
|---|---|---|---|
| 7,209,810 | B2 | 4/2007 | Meyer et al. |
| 7,610,152 | B2 | 10/2009 | Meyer et al. |
| 7,650,207 | B2 | 1/2010 | Metzger |
| 7,966,126 | B2 | 6/2011 | Willis et al. |
| 8,214,091 | B2 | 7/2012 | Kernwein |
| 8,417,490 | B1 | 4/2013 | Preston et al. |
| 9,140,792 | B2 | 9/2015 | Zeng |
| 2004/0140405 | A1* | 7/2004 | Meyer ............... B61L 25/028 246/122 R |
| 2009/0228118 | A1* | 9/2009 | Von Schwertfuehrer .................. B60R 25/00 706/54 |
| 2010/0312461 | A1* | 12/2010 | Haynie ............... B61L 25/026 701/117 |
| 2012/0323411 | A1* | 12/2012 | Whitwam ............ B61L 11/08 701/19 |
| 2015/0239482 | A1* | 8/2015 | Green ................. B61L 15/0063 246/122 R |
| 2020/0023869 | A1* | 1/2020 | Poesel ................ B61L 25/025 |
| 2021/0078620 | A1* | 3/2021 | Kanner ............... B61L 15/0063 |
| 2021/0116579 | A1* | 4/2021 | Rezaei ................ G01S 19/25 |

FOREIGN PATENT DOCUMENTS

| | | | |
|---|---|---|---|
| EP | 1705095 A1 * | 9/2006 | ............ B61L 25/021 |
| KR | 101789188 B1 * | 5/2016 | |

OTHER PUBLICATIONS

D. Lu and Baigen Cai, "Case study of differential-GPS safety integrity performance on Qinghai-Tibet railway line," 2017 15th International Conference on ITS Telecommunications (ITST), Warsaw, Poland, 2017, pp. 1-6, doi: 10.1109/ITST.2017.7972206. (Year: 2017).*

P. Salvatori, A. Neri, C. Stallo, V. Palma, A. Coluccia and F. Rispoli, "Augmentation and Integrity Monitoring Network and EGNOS performance comparison for train positioning," 2014 22nd European Signal Processing Conference (EUSIPCO), Lisbon, Portugal, 2014, pp. 186-190. (Year: 2014).*

L. Marradi et al., "GNSS for Enhanced Odometry: The GRAIL-2 results, " 2012 6th ESA Workshop on Satellite Navigation Technologies (Navitec 2012) & European Workshop on GNSS Signals and Signal Processing, Noordwijk, Netherlands, 2012, pp. 1-7, doi: 10.1109/NAVITEC.2012.6423069. (Year: 2012).*

J. Otegui, A. Bahillo, I. Lopetegi and L. E. Diez, "A Survey of Train Positioning Solutions," in IEEE Sensors Journal, vol. 17, No. 20, pp. 6788-6797, 15 Oct. 15, 2017, doi: 10.1109/JSEN.2017.2747137. (Year: 2017).*

Bancroft JB, Lachapelle G. Data fusion algorithms for multiple inertial measurement units. Sensors (Basel). 2011;11(7):6771-98. doi: 10.3390/s110706771. (Year: 2011).*

J. Otegui, A. Bahillo, I. Lopetegi and L. E. Diez, "Evaluation of Experimental GNSS and 10-DOF MEMS IMU Measurements for Train Positioning," in IEEE Transactions on Instrumentation and Measurement, vol. 68, No. 1, pp. 269-279, Jan. 2019, doi: 10.1109/TIM.2018.2838799. (Year: 2019).*

Heirich, et al., "Bayesian Train Localization Method Extended by 3D Geometric Railway Track Observations From Inertial Sensors", Jul. 12, 2012, pp. 1-8. https://ieeexplore.ieee.org/document/6289833.

Heirich, Oliver, "Bayesian Train Localization with Particle Filter, Loosely Coupled GNSS, IMY, and a Track Map.", Hindawi Publishing Corporation Journal of Sensors, vol. 2016, pp. 1-16. http://downloads.hindawi.com/journals/is/2016/2672640.pdf.

Zhang, et al., "An Improved Strapdown Inertial Navigation System Initial Alignment Algorithm for Unmanned Vehicles", Sensors 2018, 18, 3297, Sep. 29, 2018, pp. 1-20. https://www.google.com/url?sa=t&rct=j&q=&esrc=s&source=web&cd=6&cad=rja&uact=8&ved=2ahUKEwjMofSmtf_mAhUUuZ4KHZ_rADgQFjAFegQIAxAC&url=https%3A%2F%2Fwww.mdpi.com%2F1424-8220%2F18%2F10%2F3297%2Fpdf&usg=AOvVaw32eNG7f7eMMHqAK6q2f04C.

Winter, et al., "Increasing Accuracy in Train Localization Exploiting Track-Geometry Constraints", Accepted Publication In the 2018 21st International Conference on Intelligent Systems (ITSC), Nov. 4-7, 2018, Maui, Hawaii, USA, Nov. 7, 2018, pp. 1-8. https://www1.rmr.tu-darmstadt.de/pdf/winter-2-2018.pdf.

Nazaruddin et al., Y.Y., "On Using Unscented Kalman Filter Based Multi Sensors Fusion for Train Localization", 2019 12th Asian Control Conference (ASCC), JSME, Jun. 9, 2019, pp. 1137-1142, XP033577291.

Palma et al., V., "Performance Evaluation in terms of Accuracy Positioning of Local Augmentation and Integrity Monitoring Network for Railway Sector", 2014 IEEE Metrology for Aerospace (Metroaerospace), May 29, 2014, pp. 394-398, XP032625796.

Extended European Search Report issued in corresponding European Application No. 20899295.8, dated Dec. 19, 2023, pp. 1-8.

* cited by examiner

SYSTEM AND METHOD TO SUPERVISE VEHICLE POSITIONING INTEGRITY

RELATED APPLICATIONS

This application claims priority to U.S. Provisional Patent Application No. 62/946,024, titled "Method to Supervise the Integrity of the Vehicle Positioning in Safety Critical Application" and filed on Dec. 10, 2019, which is incorporated herein by reference.

BACKGROUND

Positioning includes determining the location of the vehicle's reference point, a predefined point on the vehicle, in a particular geo-spatial coordinate system, e.g., on a map. In other approaches, the positioning of a rail vehicle on the map of a guideway is determined by the following techniques. If the vehicle is manually operated based on signals controlled by an interlocking system, the vehicle's position on the guideway is determined based upon track circuits and/or axle counting blocks occupancy. If the vehicle is communication-based train control (CBTC) equipped, the vehicle's position on the guideway is initialized based on a radio-frequency identification (RFID) transponder reader installed on the vehicle and a corresponding transponder tag installed on the track bed. Then, the vehicle's position on the guideway is updated based on distance traveled and direction determined based on axle/wheel mounted tachometer or speed sensor measurements.

The track circuit and axle counting technique of positioning requires significant and relatively expensive infrastructure installed on the track bed and the backside and is prone to failures due to inadequate maintenance.

The RFID transponder reader and associated tag together with the tachometer or speed sensor technique of positioning requires significant infrastructure, such as transponder tags installed on the track bed, and is prone to failures in positioning accuracy due to wheel spin or slide.

DETAILED DESCRIPTION

Figure 1:
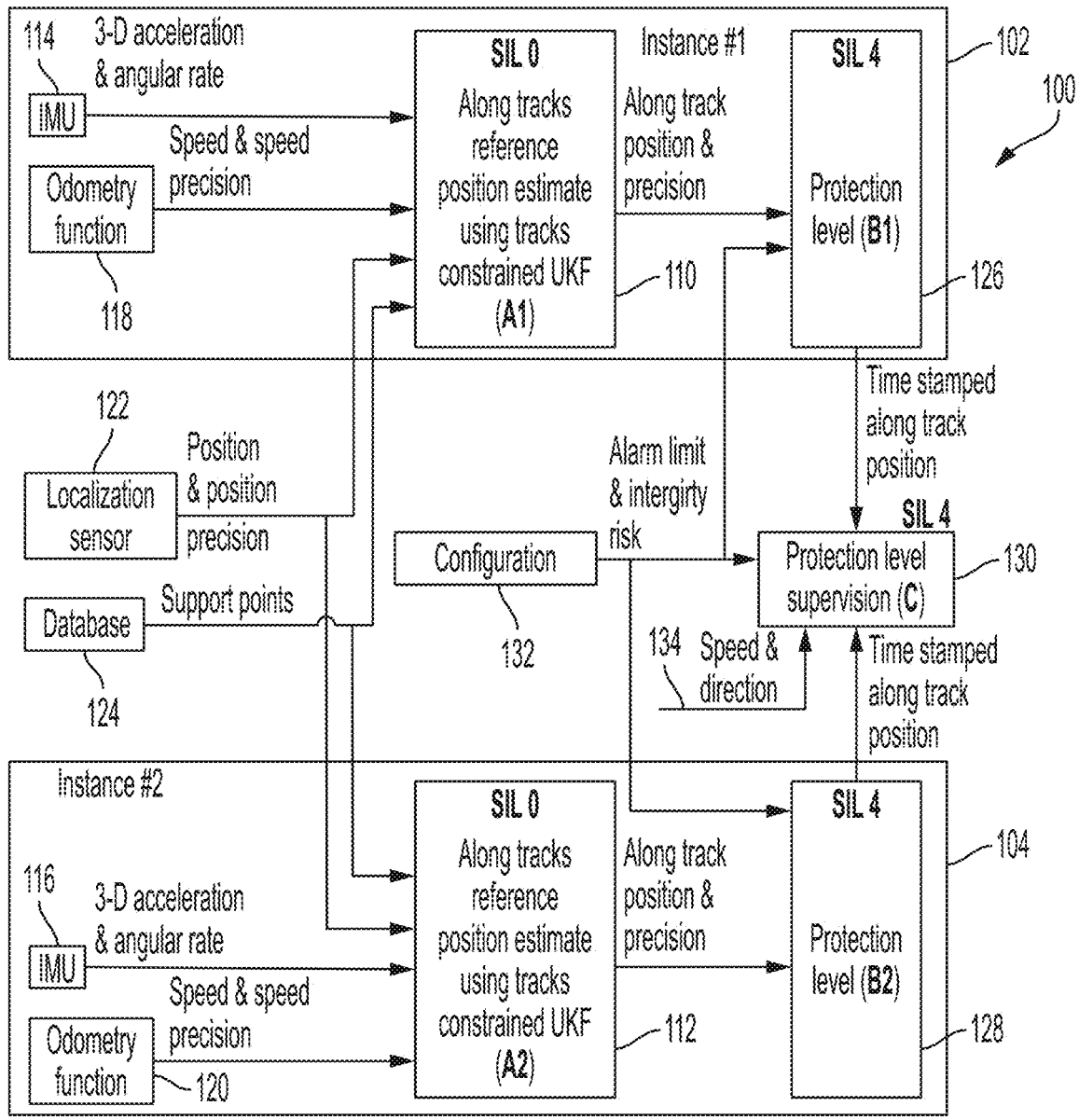
FIG. 1 is a block diagram of a vehicle positioning system and method, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, etc., are contemplated. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

For a system to be rated as Safety Integrity Level (SIL) 4, the system is required to have demonstrable on-demand reliability, and techniques and measurements to detect and react to failures that may compromise the system's safety properties. SIL 4 is based on International Electrotechnical Commission's (IEC) standard IEC 61508 and EN standards 50126 and 50129. SIL 4 requires the probability of failure per hour to range from $10^{-8}$ to $10^{-9}$. Safety systems that are not required to meet a safety integrity level standard are referred to as SIL 0.

FIG. 1 is a block diagram of a vehicle positioning system and method 100, in accordance with some embodiments. Vehicle positioning system 100 includes first and second controller instances 102, 104. The first positioning instance 102 includes a track-constrained unscented Kalman filter (UKF) subfunction 110 that computes a first estimate of the vehicle's along-tracks reference position and the precision of that estimate. The second controller instance 102 also includes a track-constrained UKF subfunction 112 that computes a second estimate of the vehicle's along-tracks reference position and the precision of that estimate. The first positioning instance 102 includes a UKF subfunction 110 using function A1. The second positioning instance 104 includes a UKF subfunction 112 using function A2. Function A1 and function A2 are subfunctions to estimate the vehicle's along-tracks reference position, and the precision of that estimate, using track-constrained unscented Kalman filter (UKF). The filter is initialized when the vehicle's reference point location is initialized upon cold start. Then, the reference point position is estimated using IMU 3-D specific force (acceleration) and angular rate measurements, this is the prediction phase of the filter. Then, when measurement is received, speed and/or position measurement, the filter uses the measurement to provide update.

The along-tracks reference position of the vehicle is determined by a track-constrained unscented Kalman filter. Reference is made to: UK Patent Application GB 2579414 Method and Apparatus for Determining a Position of a Vehicle, filed Nov. 30, 2018 and UK Patent Application GB 2579415 Method and Apparatus for Determining a Position of a Vehicle, filed Nov. 30, 2018, each of which is hereby incorporated by reference in their entirety.

The UKF subfunction 110, 112 is an algorithm that is executed on a safety integrity level 0 (SIL 0) computing platform. This is because the algorithm is complex and it is quite difficult to demonstrate it can satisfy properties needed for SIL 4 function. The UKF subfunctions 110, 112 receive data corresponding to the vehicle's 3D acceleration and angular turn rate from an inertial measuring unit (IMU) 114, 116. The UKF subfunctions 110, 112 receive data corresponding to the speed of the vehicle and the precision of the speed from an odometry function 118, 120. The odometry function 118 is a speed measurement sensor such as radar, tachometer or other type of appropriate speed measurement sensor.

The UKF subfunction 110, 112 receives data corresponding to the position of the vehicle and position precision from a localization sensor 122, such as radio frequency identifier (RFID) tags, global positioning system (GPS) sensors or global navigation satellite system (GNSS) sensors. The UKF subfunction 110, 112 receives data corresponding to support points from a central database 124. The support points are used to construct the 3-D centerline between the two running rails the vehicle is moving on determining the constrained path the vehicle is moving along. The UKF subfunction 110 computes and outputs a first along-track position estimate and a precision for the estimate. The UKF subfunction 112 computes and outputs a second along-track position estimate and a precision for the estimate.

The along-track position estimate and precision provided by the UKF subfunction 110 is received by a protection level subfunction 126. The along-track position estimate and precision provided by the UKF subfunction 112 is received by a protection level subfunction 128. The protection level subfunction 126, 128 is implemented on a SIL 4 computing device. In the first instance 102, the protection level subfunction 126 uses function B1. In the second instance 104, the protection level subfunction 128 uses function B2. Function B1 and function B2 are protection level subfunctions which are much simpler algorithms than the track-constrained UKF. The protection level subfunctions use statistical techniques to determine if the position uncertainty determined by the UKF is below a certain predefined threshold called alarm limit. If the position uncertainty is below the alarm limit, then the UKF position and associated uncertainty can be trusted.

The protection level subfunctions 126, 128 receive data corresponding to an alarm limit and integrity risk from a configuration file 132. The alarm limit value represents the maximum positioning uncertainty satisfying an integrity risk value which is the probability (per operation hour) of wrong side failure events (i.e., position uncertainty greater than the alarm limit). The integrity risk is the probability that, at any moment, the position uncertainty exceeds the alarm limit. In accordance with various embodiments, an alarm limit is 10 meters, which is the maximum position uncertainty tolerated by the Thales SelTrac CBTC product, or 6.5 meters, which is the position uncertainty of the loop based Thales SelTrac IS product. The integrity risk value is $10^{-9}$ to $10^{-11}$, representing a wrong side failure probability corresponding to SIL 4 function. The protection level subfunctions 126, 128 compute and output time-stamped along track position estimates and protection level values, as described with reference to FIG. 10.

The protection level value is the statistical bound error computed to guarantee that the probability of the position uncertainty exceeding the alarm limit is less than or equal to the target integrity risk and the probability that, at any moment, the position uncertainty exceeds the alarm limit.

Based on the estimated along-track position and the estimated covariance, the protection level subfunction 126, 128 calculates in real-time a protection level value which is compared against an alarm limit value representing the maximum positioning uncertainty satisfying an integrity risk value which is the probability (per operation hour) of wrong side failure events (i.e., position uncertainty greater than the alarm limit). The integrity risk is the probability that, at any moment, the position uncertainty exceeds the alarm limit.

To provide SIL 4 protection, the integrity risk value is typically $10^{-9}$ per hour or smaller.

The protection level subfunction 126, 128 is explainable and simpler than the along-track position estimation using track constrained UKF subfunction 110, 112 so the protection level subfunction 126, 128 is able to be implemented on a SIL 4 computing platform while the track-constrained UKF subfunction 110, 112 is implemented on a SIL 0 computing platform.

Protection level subfunction verification is based on statistically sufficient large number of test scenarios and cases ensuring sufficient coverage of both nominal test scenarios and tail case test scenarios. A tail case test scenario is a scenario that may be rare but can impact the safety integrity properties of the function. The test scenarios and cases are verified using ground truth positioning, either measured or synthetically generated. The integrity risk is demonstrated if the probability, per operation hour, of the position uncertainty (the difference between the estimated position and the ground truth position) while the protection level is less than the alarm limit, based on the collected position points presented on a Stanford diagram (FIG. 7), is less than the target integrity risk.

Figure 9:
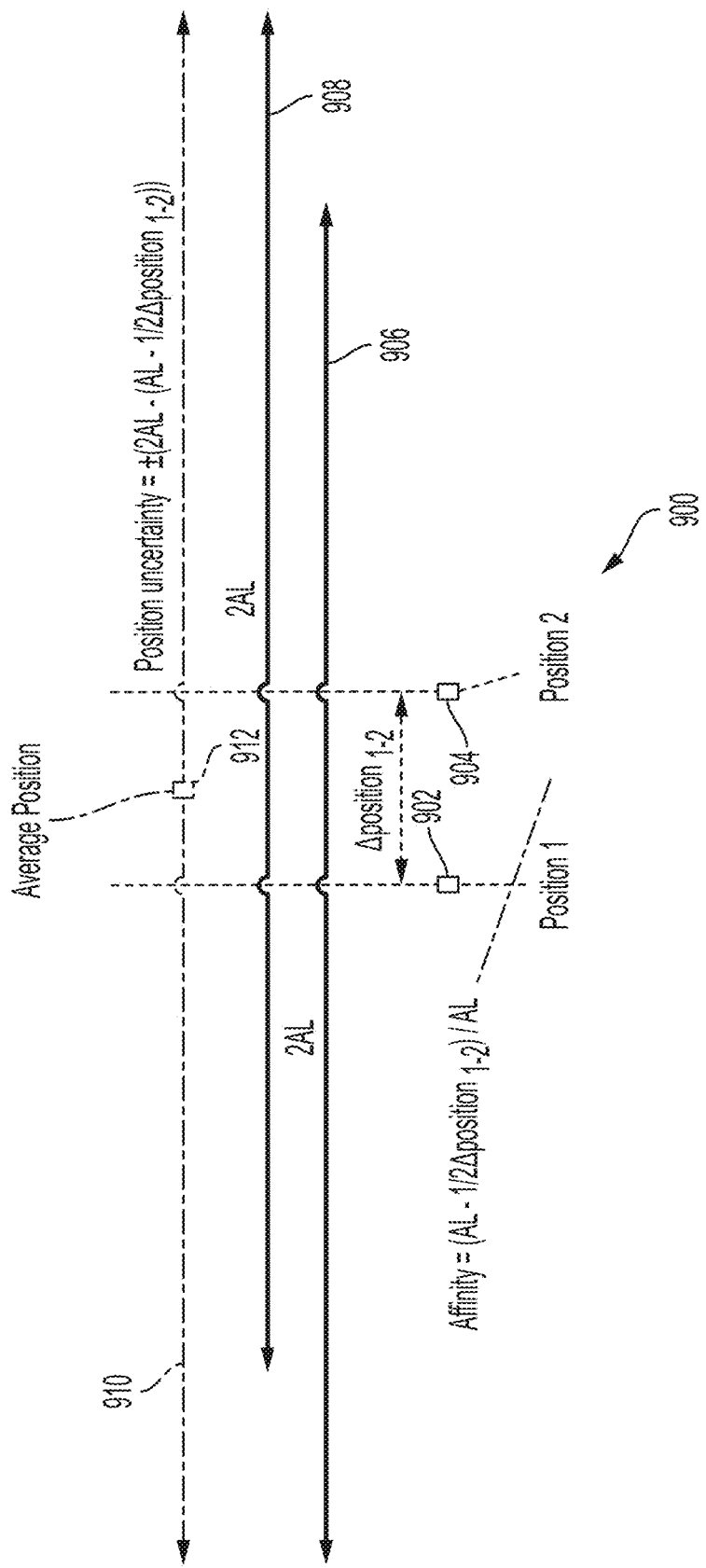
FIG. 9 is a positioning diagram, in accordance with an embodiment.
Figure 10:
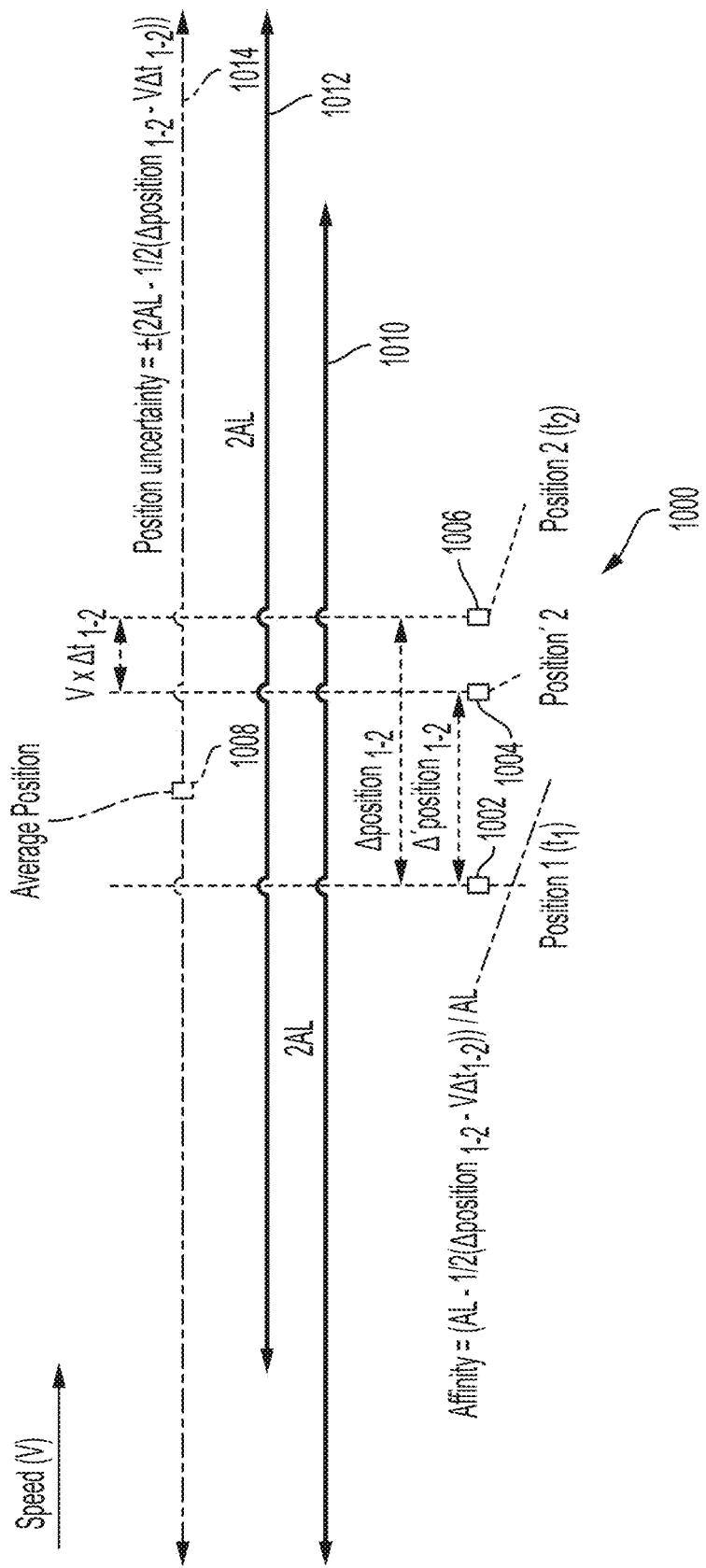
FIG. 10 is a positioning diagram, in accordance with an embodiment.

The time-stamped along-track position estimates and protection level value provided by the protection level subfunctions 126, 128 are received by a supervisory controller such as protection level supervision subfunction 130. The protection level supervision subfunction 130 is executed on an SIL 4 computing device. The protection level supervision subfunction 130 uses function C. The protection level supervision function (C) is pictorially described in FIGS. 9 and 10. Each track-constrained UKF—protection level subfunction pair provides an estimated reference point position and an indication if associated uncertainty of the estimated reference point position is greater than the alarm limit or not. If the uncertainties of both instances are less than the alarm limit then the protection level supervision subfunction 130 checks the affinity, as shown in FIGS. 9 and 10 to ensure the two instances are consistent. The protection level supervision subfunction 130 receives the speed and direction of the vehicle 134 from the odometry function.

The vehicle's reference point along-track position is estimated by two independent instances of the track constrained UKF subfunctions 110, 112. Each UKF subfunctions 110, 112 receives data from a dedicated IMU 114, 116 and speed information 118, 120 from the odometry function. The estimated positions computed by the two independent UKF subfunctions 110, 112 are compared to determine if the protection level calculated at each instance is less than the alarm limit. The ground truth along-track position is common to both instances. Therefore, the affinity is calculated as:

$$\text{Affinity} = (2 \times AL - \Delta_{Position}(P_1, P_2))/(2 \times AL), \text{ where } AL$$
is the alarm limit, $P_1$ is instance 1 position estimate and $P_2$ is instance 2 position estimate.

The affinity is positive when the position estimates are trustable. A higher affinity value indicates an increase in the trust that is placed on a position determined from the two instances position estimates. If the affinity value is zero or negative, the instances position estimates are not trusted. The position estimates are determined based on measurements taken at slightly different times, therefore the affinity value is corrected, where the corrections are based on the vehicle's speed and the time difference between the measurements corresponding to each instance. The speed corrected affinity is calculated as:

$$\text{Affinity} = (2 \times AL - \Delta position_{(P1,P2)} - 2 \times V \Delta t_{(P1,P2)})/(2 \times AL)$$

The database 124, localization sensor 122 and configuration 132 are common to both instances; however, the IMUs 114, 116 and the odometry functions 118, 120 are independent.

Figure 2:
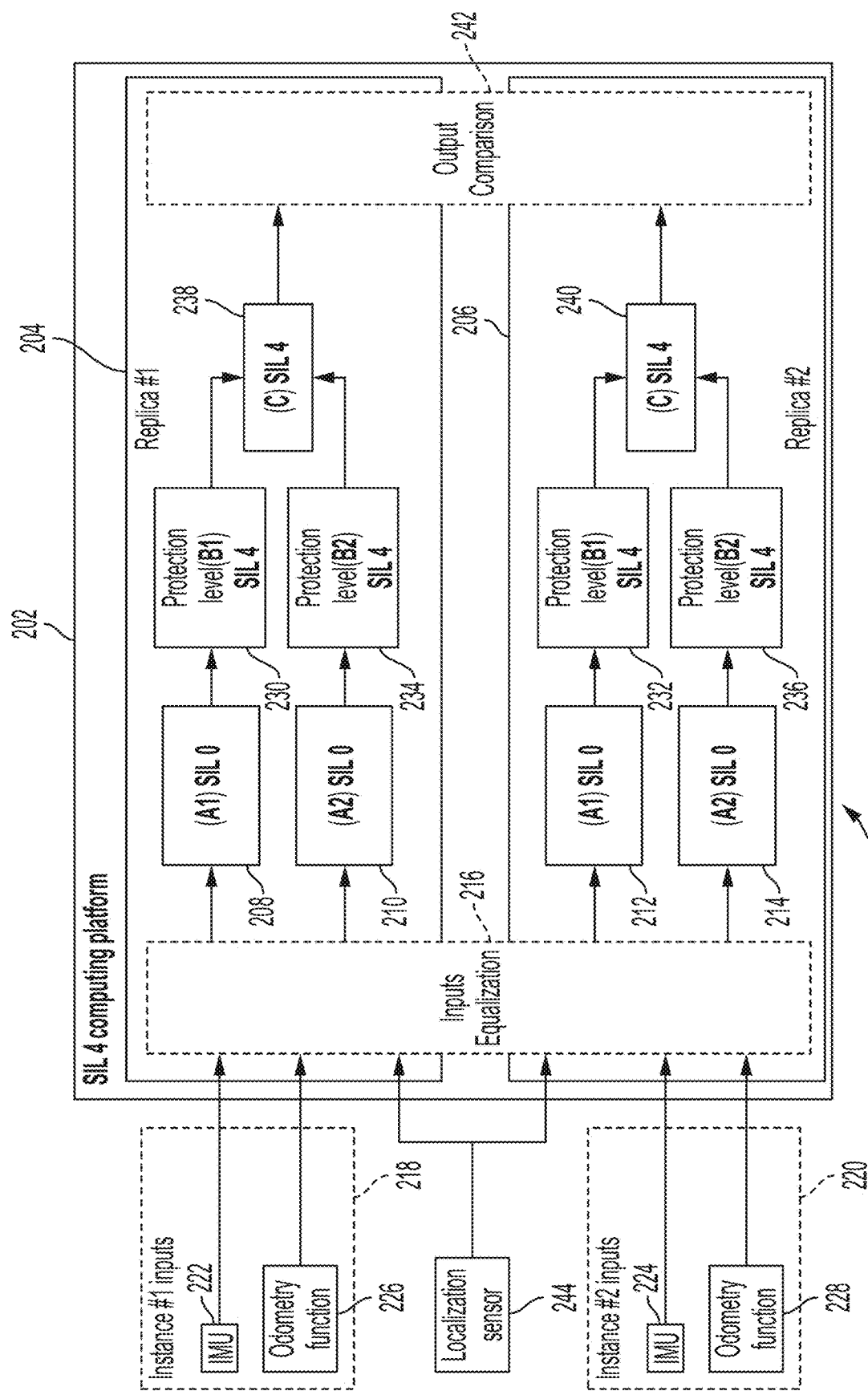
FIG. 2 is a block diagram of a vehicle positioning system and method with a centralized architecture, in accordance with some embodiments.

The output of the protection level supervision subfunction is provided to a vehicle control system (not shown) that operates the vehicle using the along-track position estimates if the along-track position estimates are validated FIG. 2 is a block diagram of a vehicle positioning system and method with a centralized architecture 200, in accordance with some embodiments.

Vehicle positioning system 200 includes SIL 4 computing platform 202 executing first and second positioning replicas 204, 206, similar to the first and second instances of FIG. 1. The first positioning replica 204 executes two track-constrained UKF 208, 210. The first UKF subfunction 208 computes the along-track reference position estimate using the track constrained UKF subfunction function A1. The second UKF subfunction 210 computes the along-track reference position estimate using the track constrained UKF subfunction function A2. The second positioning replica 206 executes two track-constrained UKFs 212, 214. The first UKF subfunction 212 computes the along-track reference position estimate using a track constrained UKF subfunction function A1. The second UKF subfunction computes the along-track reference position estimate using a track constrained UKF subfunction function A2.

Each UKF subfunction 208, 210, 212, 214 provides an estimate of the vehicle's along-tracks reference position and the precision of that estimate. The UKF subfunction 208, 210, 212, 214 is a is a safety integrity level 0 (SIL 0) function. The UKF subfunctions 208, 210, 212, 214 receives data through an input equalization 216. The first instance inputs 218 are provided to the first replica 204 while the second instance inputs 220 are provided to the second replica 206. In the input equalization 216, the first replica 204 provides the first instance inputs 218 to the second replica 206 and the second replica 206 provides the second instance inputs 220 to the first replica 204. The equalization process in this case ensures that both replicas 204, 206 have the data from the first and second inputs 218, 220. This arrangement provides replica determinism, which means if the two replicas 204, 206 have the same inputs and identical functions then the outputs of both replicas 204, 206 must be identical.

The vehicle positioning system 200 includes first and second instances of input 218, 220. The UKF subfunctions 208, 210 executed on the first replica 204. UKF subfunction 208 receive data from a first instance of inputs 218. The first instance inputs 218 include an IMU 222 providing data corresponding to the vehicle's 3D acceleration and angular turn rate. The first instance inputs 218 include an odometry function 226 providing data corresponding to the speed of the vehicle and the precision of the speed. UKF subfunction 210 receives data from a second instance of inputs 220. The second instance inputs 220 include an IMU 224 providing data corresponding to the vehicle's 3D acceleration and angular turn rate. The second instance inputs 220 include an odometry function 228 providing data corresponding to the speed of the vehicle and the precision of the speed.

The UKF subfunctions 212, 214 executed on the second replica 206. UKF subfunction 212 receive data from a first instance of inputs 218. The first instance inputs 218 include an IMU 222 providing data corresponding to the vehicle's 3D acceleration and angular turn rate. The first instance inputs 218 include an odometry function 226 providing data corresponding to the speed of the vehicle and the precision of the speed. UKF subfunction 214 receive data from a second instance of inputs 220. The first instance inputs 220 include an IMU 224 providing data corresponding to the vehicle's 3D acceleration and angular turn rate. The second instance inputs 220 include an odometry function 228 providing data corresponding to the speed of the vehicle and the precision of the speed.

The IMU 222 and odometry function 226 in the first instance inputs 218 are physically and electrically independent of the IMU 224 and odometry function 228 of the second instance 220.

The UKF subfunction 208, 210, 212, 214 receive data corresponding to the position of the vehicle and position precision from a localization sensor 224 through the input equalization 216.

The along-track position estimate and precision provided by the UKF subfunction 208 is received by a protection level subfunction 230. The along-track position estimate and precision provided by the UKF subfunction 210 is received by a protection level subfunction 234. The along-track position estimate and precision provided by the UKF subfunction 212 is received by a protection level subfunction 232. The along-track position estimate and precision provided by the UKF subfunction 214 is received by a protection level subfunction 236. The protection level subfunctions 230, 234, 232, 236 are SIL 4 functions. Protection level subfunctions 230 and 232 execute protection level function B1. Protection level subfunctions 234 and 236 execute protection level function B2. Protection level subfunctions 230, 234, 232, 236 compute and output a time-stamped along track position estimate and a protection level value. Function B1 and function B2 are protection level subfunctions which are much simpler algorithms than the track-constrained UKF. The protection level subfunctions use statistical techniques to determine if the position uncertainty determined by the UKF is below a certain predefined threshold called alarm limit. If the position uncertainty is below the alarm limit, then the UKF position and associated uncertainty can be trusted.

The time-stamped along-track position estimates and protection level values provided by the protection level subfunctions 230, 234 are received by a protection level supervision subfunction 238. The protection level supervision function (C) 230, 234 is pictorially described with respect to FIGS. 9 and 10. Each track-constrained UKF—protection level subfunction pair provides an estimated reference point position and an indication if associated uncertainty of the estimated reference point position is greater than the alarm limit or not. If the uncertainties of both instances are less than the alarm limit then the protection level supervision subfunction 130 checks the affinity, as shown in FIGS. 9 and 10 to ensure the two instances are consistent. Protection level supervision subfunction 238 is a SIL 4 function.

The time-stamped along-track position estimates and protection level values provided by the protection level subfunctions 232, 236 are received by a protection level supervision subfunction 240. Protection level supervision subfunction 240 is a SIL 4 function. The protection level supervision function determines the affinity between the two position estimates. The affinity must be positive, for the position estimates to be trusted. A higher affinity value means more trust can be assigned to the two position estimates. When the affinity has a zero or negative value, the two position estimates cannot be trusted.

An output comparison 242 receives the output of the protection level supervision subfunctions 238, 240. The output from the protection level supervision subfunctions 238, 240 is cross compared and accepted only if the two outputs are identical.

Figure 3:
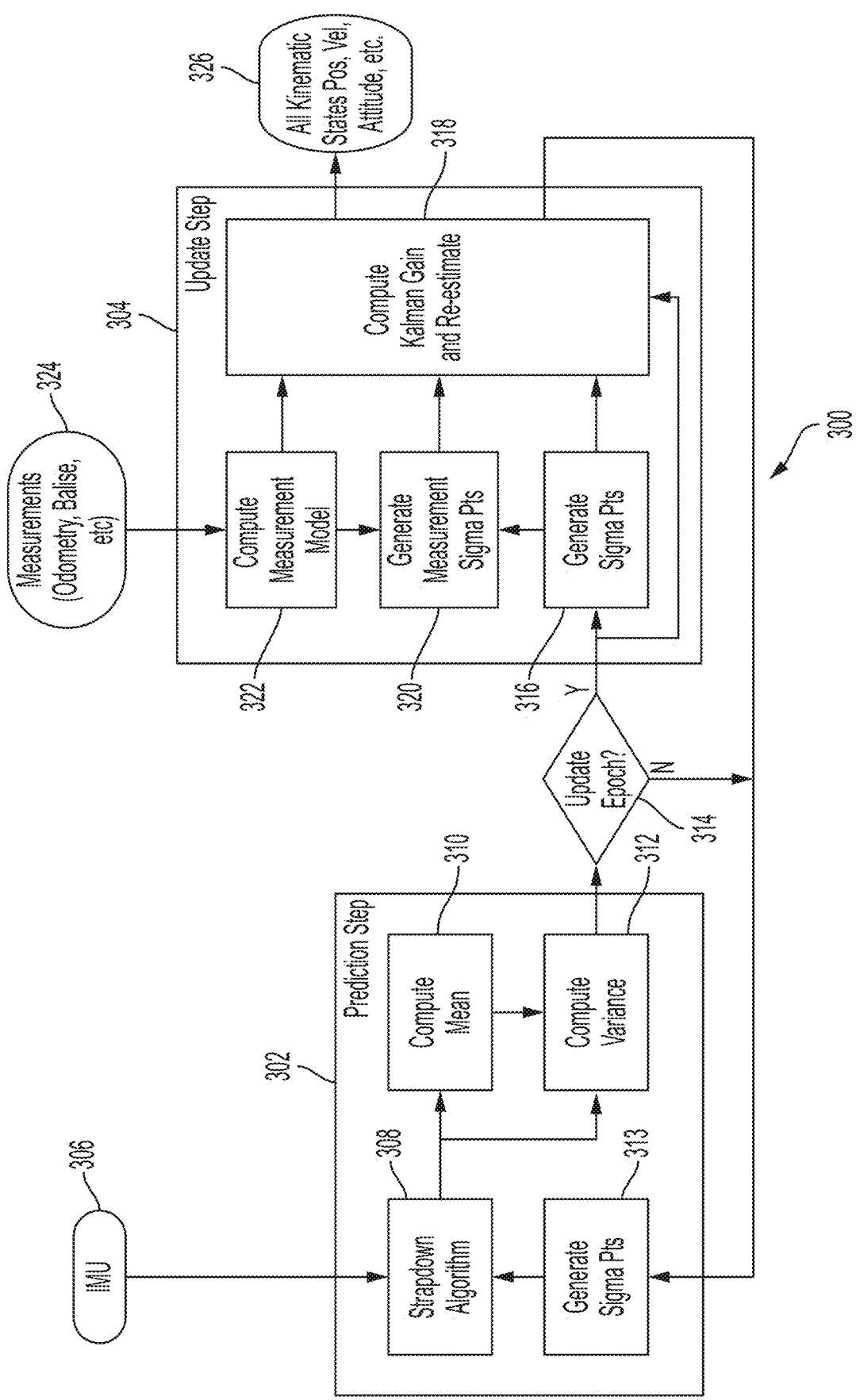
FIG. 3 is a block diagram of an unscented Kalman Filter system and method in a centralized vehicle positioning system, in accordance with some embodiments.

FIG. 3 is a block diagram of an UKF subfunction 300 in a centralized vehicle positioning system, in accordance with some embodiments.

The UKF subfunction 300 is used to estimate vehicle position based upon sensor measurements which indirectly measure the vehicle's motion. The UKF subfunction 300 recursively predicts the position in a prediction step 302 and updates the predicted state based upon measurement data in an update step 304. The position of the vehicle is a part of the state estimated by the UKF subfunction 300.

The UKF subfunction algorithm 300 includes a prediction step 302 and an update step 304.

The prediction step 302 estimates the vehicle's reference position using a strapdown navigation algorithm 308 such as a Lie group strapdown navigation algorithm. A Lie-group strapdown navigation algorithm operates in a state space and/or a measurement space which is represented by Lie groups (in particular, matrix Lie groups). It is advantageous to represent the state and the measurement spaces using Lie groups, because Lie groups can easily represent a complex state which comprises multiple sub-states using a product matrix Lie group without losing the typological structure of the state space.

The navigation algorithm calculates by dead reckoning the kinematic state (e.g., the position, attitude and velocity) of the vehicle to which the inertial measurement unit 306 is mounted. The navigation algorithm 308 generates data indicative of the predicted position of the vehicle by constraining the state, determined based on the IMU measurements 306 during the prediction step, such that the predicted position of the vehicle lies on a track defined by the track geometry data represented by the support points and the cubic spline approximation between the support points. The navigation algorithm 308 is constrained by track geometry data (i.e., the constraints imposed by the transport network to the vehicle). By constraining the navigation algorithm 308 by the track geometry data, the problem of estimating an unconstrained three-dimensional position of the vehicle is advantageously reduced to the problem of estimating a one-dimensional position of the vehicle along the track of the transport network, because the vehicle has only one degree of freedom along the track. Further, the constrained navigation algorithm 308 can be used to model the propagation of kinematic state estimation errors into the one-dimensional position solution space. Consequently, the utilization of the track geometry data in the strapdown inertial navigation algorithm is useful for improving the accuracy of the determined position of the vehicle and can reduce significantly errors accumulated by the UKF subfunction 300.

The position solution is constrained to evolve along the track's centreline represented by support points from a database, such as 124 in FIG. 1, and cubic spline calculated in real-time. The UKF subfunction 100, 112 approximates a probability distribution by deterministically sampling support points and assigning weight to each of these points. Obtaining the track geometry data includes accessing a map database, where the map database includes support points positioned along tracks within the transport network; retrieving from the map database support points in the vicinity of the vehicle; and applying an interpolation function through the retrieved support points to obtain a track constraint function, wherein the track geometry data comprises the track constraint function. By applying an interpolation function through the retrieved support points from the map database, the track constraint function (which is included within the track geometry data) comprises lines/curves which represent centerlines of the tracks within the transport network. The cubic spline interpolation implicitly provides a twice differentiable curve with a continuous second-order derivative. Furthermore, amongst all of the twice differentiable functions, the cubic spline interpolation function yields the smallest norm of strain energy and allows the track constraint function obtained thereby to have a curve progression with minimal oscillations between the support points. The support points density reflects the tracks curvature and bounds the vehicle's reference position representation error. The IMU longitudinal axis is constrained to be parallel to the longitudinal axis of the moving platform that it is mounted to and which is itself determined from the track centreline constraint support points.

The strapdown algorithm 308 receives data corresponding to the 3-D acceleration and 3-D angular rate of turn measured by an IMU 306. The prediction step 302 computes the mean 310 of the vehicle reference position estimates and computes the variance 312 of the vehicle reference position estimates. The UKF subfunction algorithm 300 determines at decision step 314 if process should proceed to the update step 304 based on the variance 312. If the process should not proceed to the update step 304, the process returns to the prediction step 302 and the prediction step 302 generates Sigma points 313 and uses the strapdown navigation algorithm 308 to compute a new estimate of the vehicle's reference position. The variance (uncertainty) of the predicted position is used to determine if the process proceeds to the update step 304.

If the epoch is updated, the update step generates sigma points 316. Receiving measurements 324, including odometry, balise detection and other appropriate measurements, the update step 304 computes a measurement model 322. The speed tangent to the track centreline is updated with an along-track speed measurement provided by a radar, tachometer, speed sensor or another type of speed measurement sensor. Upon position update from a localization sensor 122 in FIG. 1, such as RFID transponder reader, the along-track position is updated.

The update is performed based on the difference between the expected measurement (based on the prediction and its precision) and the actual measurement and its precision. In case of lack of measurements, pseudo-measurements derived from the track constraint are used to constrain the attitude error growth.

The generated sigma points 316 and the measurement model 322 are used to generate measurement sigma points 320, measurements corresponding the set of generated sigma points 316. The generated sigma points 316, the measurement sigma points 320 and the measurement model 322 are used to compute the Kalman gain and re-estimate the kinematic states of the vehicle 326 including position, velocity, attitude and other appropriate states. The update step 304 returns to the prediction step 302 and generates sigma points 313 for a next generation estimate.

Figure 4:
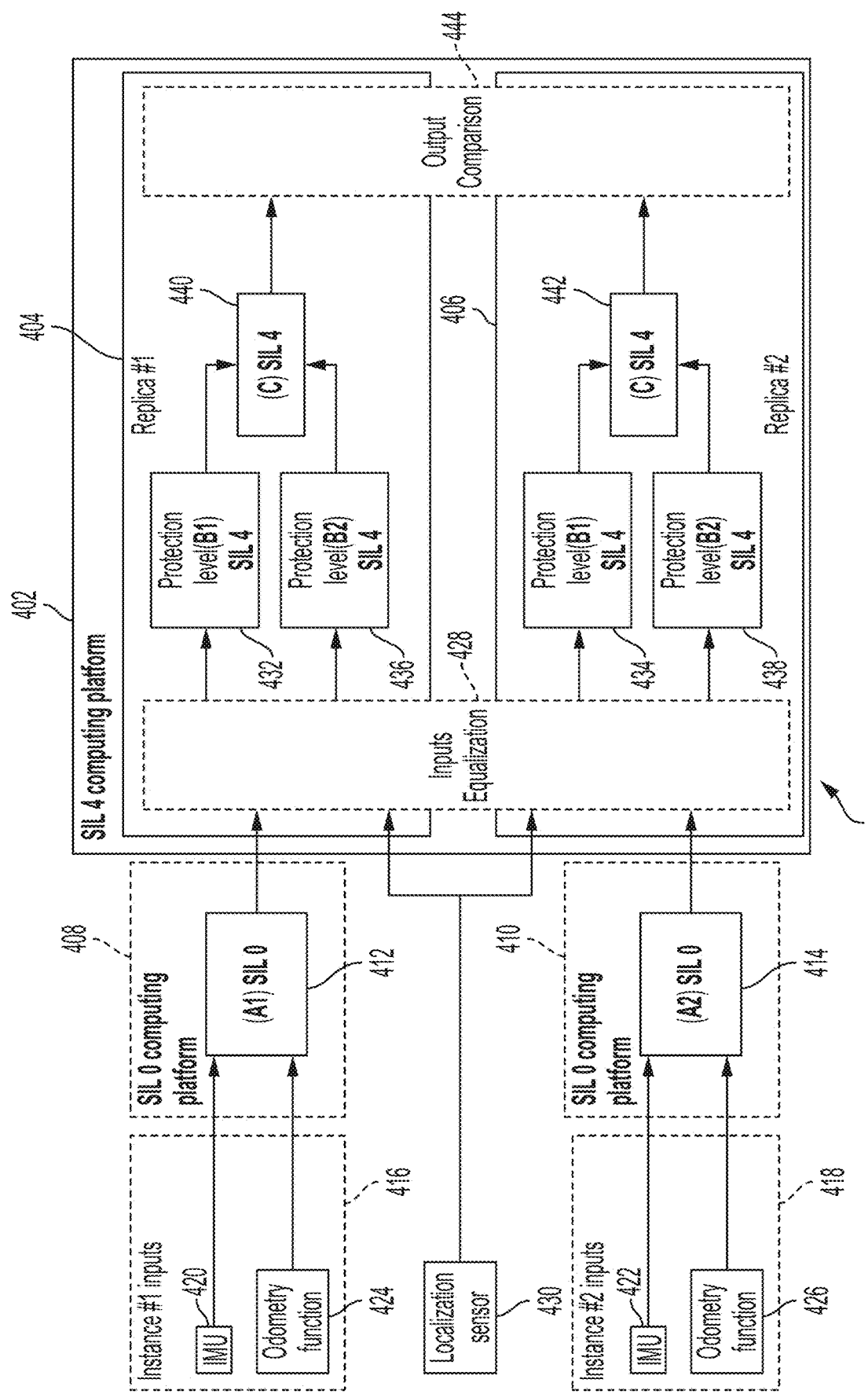
FIG. 4 is a block diagram of a vehicle positioning system and method with a distributed architecture, in accordance with some embodiments.

FIG. 4 is a block diagram of a vehicle positioning system and method with a distributed architecture 400, in accordance with some embodiments.

Vehicle positioning system 400 includes a supervisory controller SIL 4 computing platform 402 executing first and second positioning replicas 404, 406. The first positioning replica 404 receives an estimate of the vehicle's along-tracks reference position and the precision of that estimate from a track-constrained UKF 412. The second positioning replica 404 receives an estimate of the vehicle's along-tracks reference position and the precision of that estimate from a track-constrained UKF 414. The UKF subfunctions 412, 414 are algorithms that runs on a controller SIL 0 computing platform 408, 410. The first UKF subfunction 412 computes the along-track reference position estimate using a track constrained UKF subfunction function A1. The second UKF subfunction 414 computes the along-track reference position estimate using a track constrained UKF subfunction function A2.

The UKF subfunction 412 receives data from a first instance of inputs 416. The first instance inputs 416 include an IMU 420 providing data corresponding to the vehicle's 3D acceleration and angular turn rate. The first instance inputs 416 include an odometry function 424 providing data corresponding to the speed of the vehicle and the precision of the speed.

The UKF subfunction 414 receives data from a second instance of inputs 418. The first instance inputs 418 include an IMU 422 providing data corresponding to the vehicle's 3D acceleration and angular turn rate. The second instance inputs 418 include an odometry function 426 providing data corresponding to the speed of the vehicle and the precision of the speed.

The first and second replica 404, 406 receive data corresponding to the estimate of the vehicle's along-tracks reference position and the precision of that estimate from the UKF subfunction 412, 410 through input equalization 428. The first and second replica 404, 406 receive data corresponding to the position of the vehicle and position precision from a localization sensor 439 through the input equalization 428.

The along-track position estimates and precision provided by the UKF subfunction 412 are received by a protection level subfunction 432, 434. The along-track position estimates and precision provided by the UKF subfunction 414 are received by a protection level subfunction 436, 438. The protection level subfunctions 432, 436, 434, 438 are implemented on SIL 4 computing platforms. The protection level subfunctions 432, 436, 434, 438 computes and outputs a time-stamped along track position estimate and protection level values. Protection level subfunctions 432 and 434 execute protection level function B1. Protection level subfunction 436 and 438 execute protection level function B2.

The time-stamped along-track position estimates and protection level values provided by the protection level subfunctions 432, 436 are received by a protection level supervision subfunction 440. The protection level supervision subfunction 440 is executed on SIL 4 computing platforms. The protection level supervision subfunction 440 executes protection level supervision function C.

The time-stamped along-track position estimates and protection level values provided by the protection level subfunctions 434, 438 are received by a protection level supervision subfunction 442. The protection level supervision subfunction 442 is executed on a SIL 4 computing device. The protection level supervision subfunction 442 executes protection level supervision function C.

An output comparison 444 receives the output of the protection level supervision subfunctions 440, 442. The output of the protection level supervision subfunctions 440, 442 include an along-tracks position, a flag indicating if the position uncertainty is less than the alarm limit and the affinity between the two position estimates. The output of the protection level supervision subfunctions 440, 442 are cross compared and accepted only if the two outputs are identical.

Figure 5:
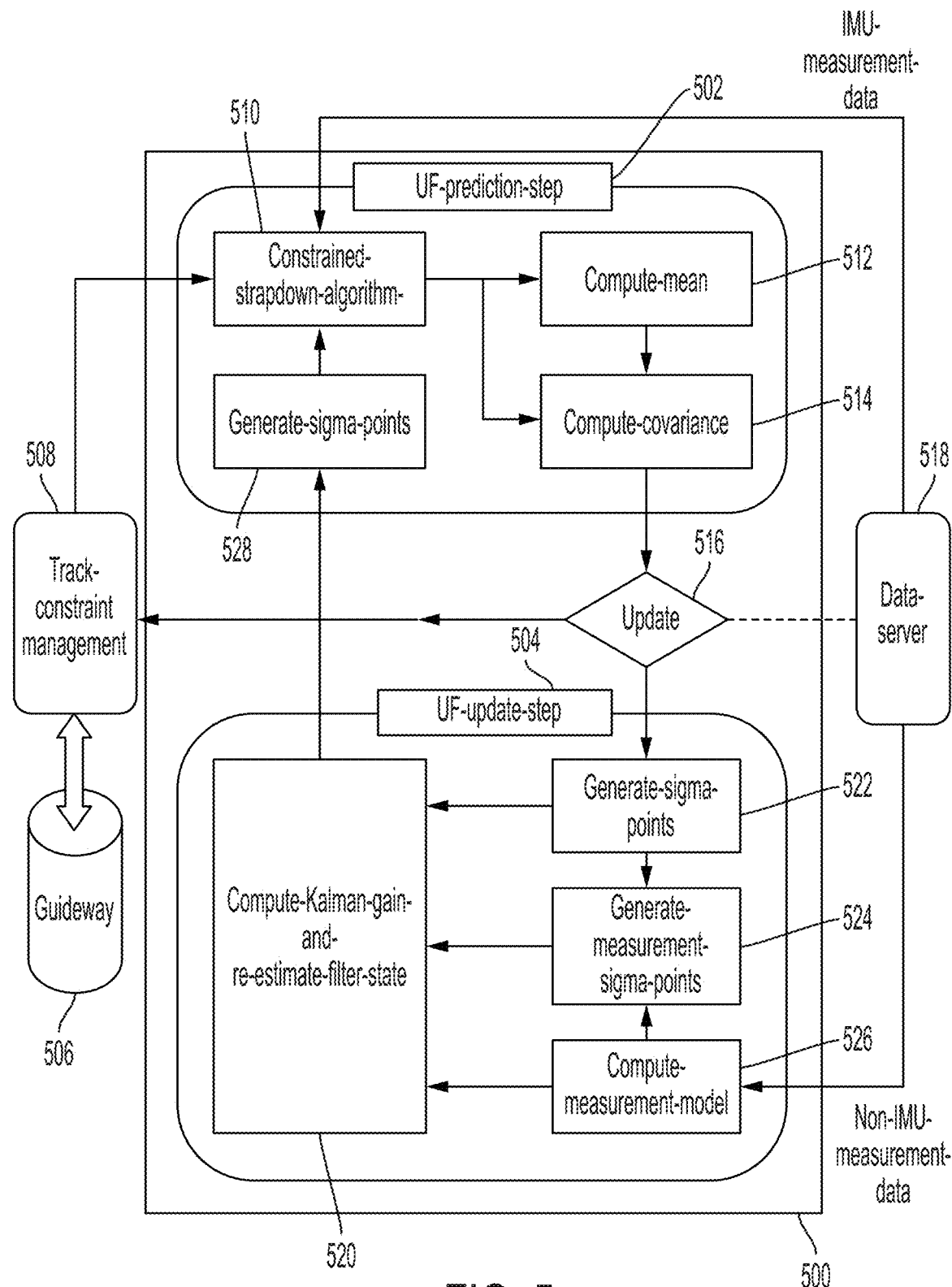
FIG. 5 is a block diagram of an unscented Kalman Filter system and method in a distributed vehicle positioning system, in accordance with some embodiments.

FIG. 5 is a block diagram of an unscented Kalman filter in a distributed vehicle positioning system 500, in accordance with some embodiments.

The UKF subfunction algorithm 500 includes a prediction step 502 and an update function 504.

The prediction step 502 estimates the vehicle's reference position using a strapdown navigation algorithm 510 such as a Lie group strapdown navigation algorithm. The strapdown algorithm 510 receives data corresponding IMU measurement data from data server 518. The strapdown algorithm 510 receives data from track-constrained management 508. The prediction step 502 computes the mean 512 of the vehicle reference position estimates and computes the variance 514. The UKF subfunction algorithm 500 determines if the process 500 proceeds to the update step 504 using the variance 514. The prediction step 502 generates sigma points 528 and uses the strapdown navigation algorithm 510 to compute a new estimate of the vehicle's reference position.

The update step 504 generates sigma points 522. Using non-IMU measurement data from the data server 518, the update step 504 computes a measurement model 526. The generated sigma points 522 and the measurement model 526 are used to generate measurement sigma points 524. The generated sigma points 522, the measurement sigma points 524 and the measurement model 526 are used to compute the Kalman gain and re-estimate the filter state. The update step 504 returns to the prediction step 502 and generates sigma points 528 for a next generation estimate.

The track-constraint management 508 sends and receives data from the guideway 506.

Figure 6:
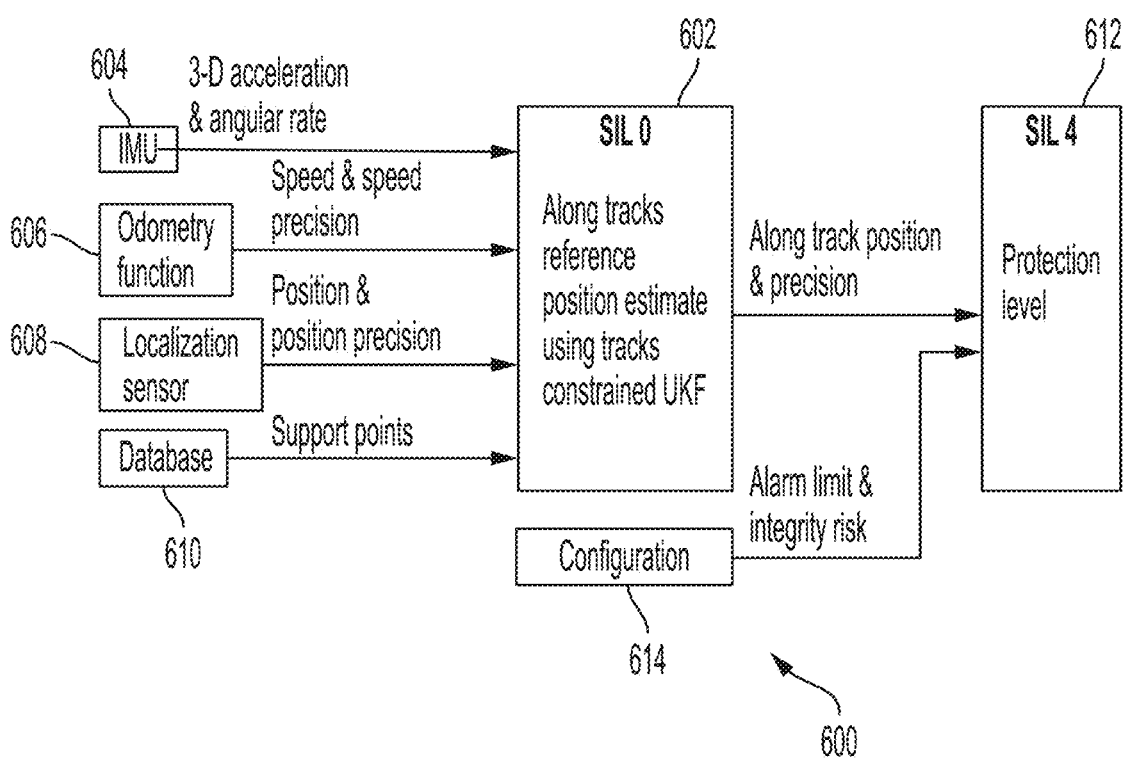
FIG. 6 is a block diagram of a protection level subfunction system and method, in accordance with an embodiment.

FIG. 6 is a block diagram of a protection level subfunction 600, in accordance with an embodiment.

A UKF subfunction 602 is executed on a SIL 0 computing platform. The UKF subfunction 602 computes an along-tracks reference position estimate using track constrained UKF subfunction algorithm. The UKF subfunction 602 receives data corresponding to 3D acceleration and angular rate from an IMU 604. The UKF subfunction 602 receives data corresponding to the speed of the vehicle and the precision of the speed from an odometry function 606. The UKF subfunction 602 receives data corresponding to the position of the vehicle and the precision of the position from a localization sensor 608. The UKF subfunction 602 receives data corresponding to support points from a database 610.

The UKF subfunction 602 computes the along track position of the vehicle and the precision of that position. A protection level function 612 receives the along track position of the vehicle and the precision of that position. The protection level function 612 is executed on a SIL 4 computing platform. The protection level function 612 receives the alarm limit and integrity risk from a configuration file 614. The protection level function 612 computes a protection level value.

When the protection level value, calculated in real-time, is less than the alarm limit, the along-track position of the vehicle reference point and its precision distribution (covariance) calculated by the track constrained UKF subfunction, pending further checks by the protection level supervision function, can be trusted even though its safety integrity level is zero.

The safety integrity level of the protection level function is four (SIL 4) when sufficiently large scenarios and test cases are tested and the integrity risk target is demonstrated based on these test results.

Figure 7:
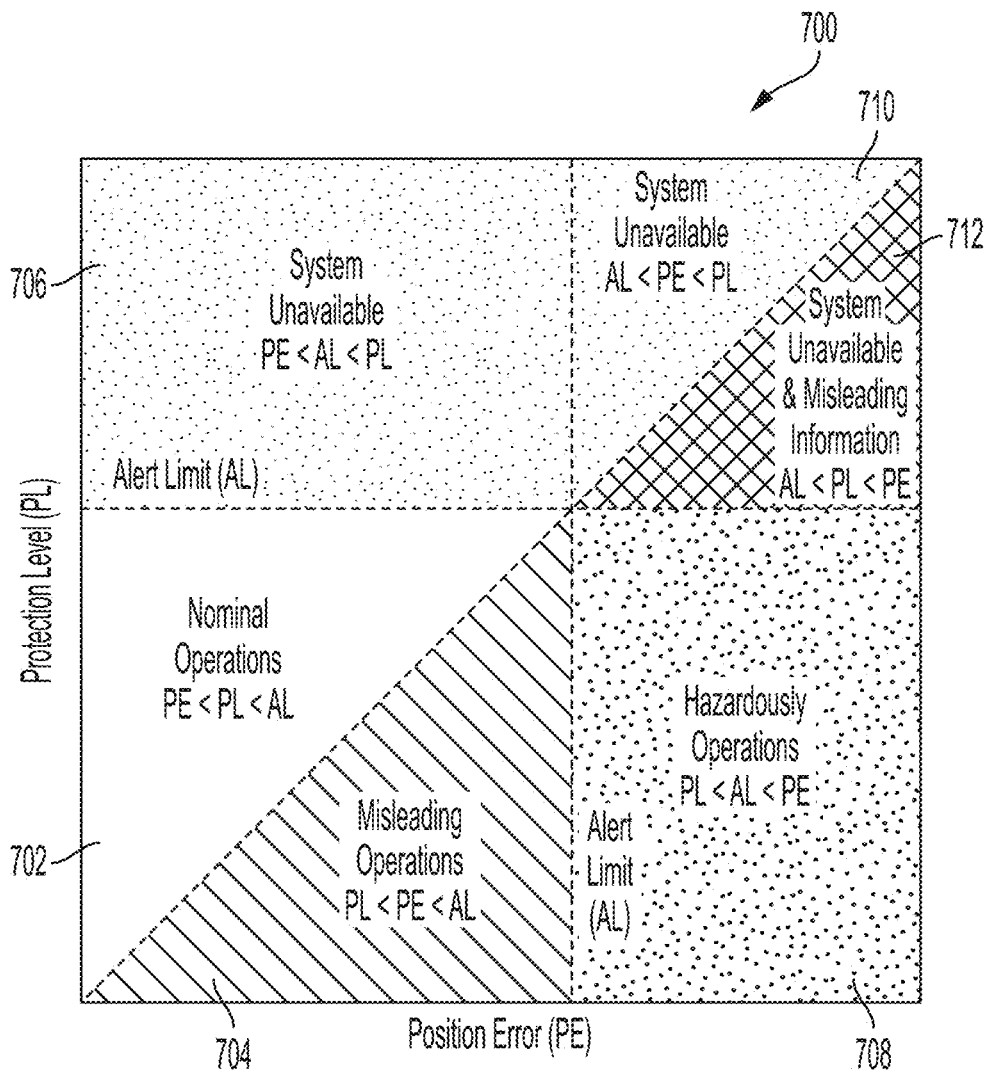
FIG. 7 is a Stanford Diagram for protection level supervision, in accordance with an embodiment.

FIG. 7 is a Stanford Diagram for the protection level calculation method 700, in accordance with an embodiment. The Stanford Diagram 700 is used by a Stanford Diagram verification technique to verify the protection level output by comparing the position error (PE) and the protection level (PL) to the alarm limit (AL).

In the "Nominal Operation" zone 702, the protection level is greater than the position error, the protection level is less than the alarm limit and the position error is less than the alarm limit. If these conditions are met, the function safety integrity of the position estimate is properly demonstrated.

In the "Misleading Operation" zone 704, the position error is less than the alarm limit, and the protection level is less than the position error but still less than the alarm limit. The safety integrity properties of the function is ensured in this zone however the results are misleading because the protection level is less than the position error.

In the rest of the zones 706, 708, 710, 712 the system is either unavailable or in a hazardous situation. Real-time supervision that the protection level is less than the alarm limit relying on statistical demonstration that the probability of wrong side failure, outside of the "nominal operation" zone 702, per operation hour is less than $10^{-9}$.

Figure 8:
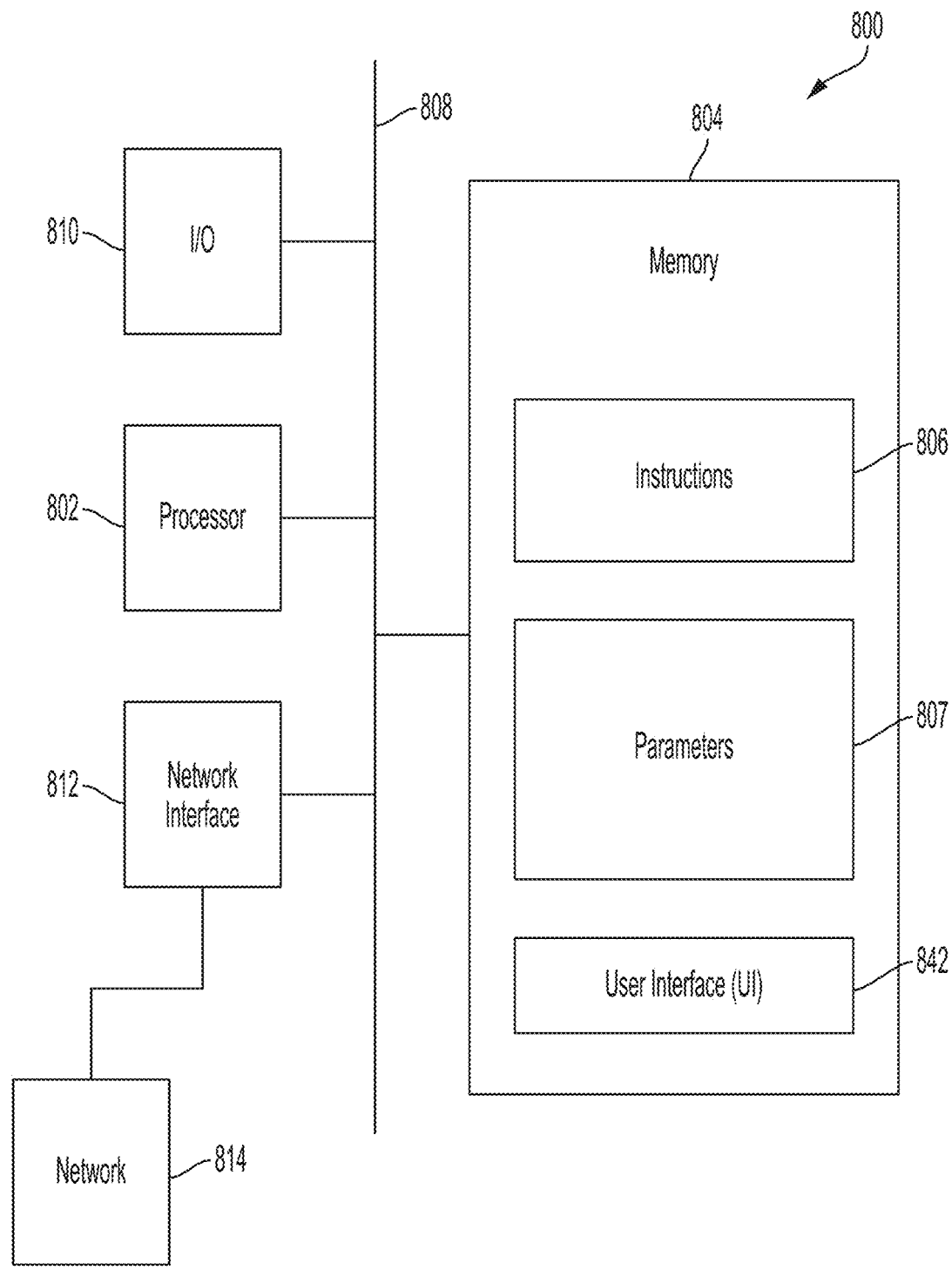
FIG. 8 is a high-level block diagram of a processor-based system usable in conjunction with one or more embodiments.

FIG. 8 is a high-level block diagram of a processor-based system 800 usable in conjunction with one or more embodiments.

In some embodiments, computing platform 800 is a general purpose computing device including a hardware processor 802 and a non-transitory, computer-readable storage medium 804. Storage medium 804, amongst other things, is encoded with, i.e., stores, computer program code 806, i.e., a set of executable instructions. Execution of instructions 806 by hardware processor 802 represents (at least in part) a processing tool which implements a portion or all of the methods described herein in accordance with one or more embodiments (hereinafter, the noted processes and/or methods).

Processor 802 is electrically coupled to computer-readable storage medium 804 via a bus 808. Processor 802 is also electrically coupled to an I/O interface 810 by bus 808. A network interface 812 is also electrically connected to processor 802 via bus 808. Network interface 812 is connected to a network 814, so that processor 802 and computer-readable storage medium 804 are capable of connecting to external elements via network 814. Processor 802 is configured to execute computer program code 806 encoded in computer-readable storage medium 804 in order to cause system 800 to be usable for performing a portion or all of the noted processes and/or methods. In one or more embodiments, processor 802 is a central processing unit (CPU), a multi-processor, a distributed processing system, an application specific integrated circuit (ASIC), and/or a suitable processing unit.

In one or more embodiments, computer-readable storage medium 804 is an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 804 includes a compact disk-read only memory (CD-ROM), a compact disk-read/write (CD-R/W), and/or a digital video disc (DVD).

In one or more embodiments, storage medium 804 stores computer program code 806 configured to cause system 800 to be usable for performing a portion or all of the noted processes and/or methods. In one or more embodiments, storage medium 804 also stores information which facilitates performing a portion or all of the noted processes and/or methods. In one or more embodiments, storage medium 804 stores parameters 807.

Processing system 800 includes I/O interface 810. I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802.

Processing system 800 also includes network interface 812 coupled to processor 802. Network interface 812 allows system 800 to communicate with network 814, to which one or more other computer systems are connected. Network interface 812 includes wireless network interfaces such as BLUETOOTH, WIFI, LTE, 5G, WIMAX, GPRS, or WCDMA; or wired network interfaces such as ETHERNET, USB, or IEEE-1364. In one or more embodiments, a portion or all of noted processes and/or methods, is implemented in two or more systems 800.

Processing system 800 is configured to receive information through I/O interface 810. The information received through I/O interface 810 includes one or more of instructions, data, design rules, libraries of standard cells, and/or other parameters for processing by processor 802. The information is transferred to processor 802 via bus 808. Processing system 800 is configured to receive information related to a UI through I/O interface 810. The information is stored in computer-readable medium 804 as user interface (UI) 842.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

FIG. 9 is a positioning diagram 900, in accordance with an embodiment.

In the vehicle positioning system, the position estimates from multiple along-tracks constrained UKF function and its associated protection level function, such as 126 and 128 in FIG. 1, received by a protection level supervision function such as 130 in FIG. 1, which compares the two position estimates, assumed here simultaneously estimated.

Given an Alarm Limit (AL), two estimated positions 902 and 904 are separated by $\Delta position_{1-2}$. Position 1 902 has a first 2AL span 906. Position 2 904 has a second 2AL span 908.

If the difference between the two estimated along-track positions ($\Delta position_{1-2}$) is less than or equal to 2AL then the vehicle's reference point along-track position determined based on the two instances position estimates can be trusted. The vehicle's reference point along-track position is determined to be the average position 912 between the two position estimates 902, 904. The affinity ($\delta$) between the two position estimates is $\delta=(AL-\frac{1}{2}\Delta position_{1-2})/AL$ and the along-track position uncertainty (PU) is $PU=\pm(2AL-(AL-\frac{1}{2}\Delta position_{1-2}))$ The larger the difference between the two estimated along-track positions ($\Delta position_{1-2}$), the smaller the affinity between the two position estimates and the larger the position uncertainty.

If the difference between the two estimated along-track positions ($\Delta position_{1-2}$) is greater than 2AL then the vehicle's reference point along-track position determined based on the two instances position estimates cannot be trusted. If this situation persists over a certain predefined period (e.g. 500 msec) then the position is determined to unknown.

Supervisions are implemented to monitor the behaviour of the difference between the two estimated along-track positions ($\Delta position_{1-2}$) in time, such as:

If the $\Delta position_{1-2}$ grows and approaches the 2AL threshold then an alarm should be raised indicating that the affinity between the two position estimates is low and the estimated position may become unstable.

If the $\Delta position_{1-2}$ shrinks, the affinity between the two position estimates increases and the confidence in the estimated position increases, too.

The average and standard deviation calculated on multiple $\Delta position_{1-2}$ may indicate the position confidence level. For example, a constant or close to constant average with constant or close to constant standard deviation is a possible indication of oscillatory behavior with a certain amplitude.

FIG. 10 is a positioning diagram 1000, in accordance with an embodiment.

In the vehicle positioning system, the position estimates from multiple protection level functions, such as 126 and 128 in FIG. 1, received by a protection level supervision function such as 130 in FIG. 1, which compares the two position estimates, assumed here not simultaneously estimated.

A first positions 1002 is estimated at time $t_1$. A second position is estimated at time $t_2$ greater than $t_1$ and 1004 are separated by $\Delta position_{1-2}$. Position 1 1002 has a first 2AL span 1010. Position 2 1006 has a second 2AL span 1012.

In reality the position estimates 1002, 1006 from the two instances are not simultaneously determined. For example, position 1 1002 is determined at time $t_1$ and position 2 1006 is determined at time $t_2$ greater than $t_1$. In this case the time difference between the two estimates ($\Delta t_{1-2}$) has to be considered in the calculation of the affinity between the two position estimates and the position uncertainty together with the vehicle's speed.

If the difference between the two time and speed compensated estimated along-track positions 1002, 1004 ($\Delta' position_{1-2}$) is less than or equal to the alarm limit then $\Delta' position_{1-2}=\Delta position_{1-2}-V\Delta t_{1-2}$ and the vehicle's reference point along-track position determined based on the two instances position estimates can be trusted.

The vehicle's reference point along-track position 1008 is determined to the average between the two position estimates, the affinity ($\delta$) between the two position estimates is $\delta=(AL-\frac{1}{2}\Delta' position_{1-2})/AL$ and the along-track position uncertainty 1014 $PU=\pm(2AL-(AL-\frac{1}{2}\Delta' position_{1-2}))$ If the difference between the two time and speed compensated estimated along-track positions ($\Delta' position_{1-2}$) is greater than 2AL then the vehicle's reference point along-track position determined based on the two instances position estimates cannot be trusted. If this situation persists over a certain predefined period (e.g., 500 msec) then the position is determined to unknown.

Supervisions are implemented to monitor the behavior of the difference between the two time and speed compensated estimated along-track positions ($\Delta' position_{1-2}$).

Based on two independent instances, each using different sets of IMU and speed function source, of the along-track position estimated and the associated protection level the safety integrity level of the along-track vehicle's reference point position is enhanced if the protection level calculated at each instance is less than the alarm limit.

Based on two independent instances, each using different sets of IMU and speed function source, of the along-track position estimated and the associated protection level the safety integrity level of the along-track vehicle's reference point position is enhanced if the difference between the two position estimates, in consideration of the time difference between the two estimates, is less than or equal to 2AL.

Monitoring the time and speed compensated difference between the two position estimates behavior over time supervises the stability of the vehicle's reference point along-track position as if the difference is approaching the 2AL value and the affinity between the position estimates is low. The instability is increased to a point in which the position cannot be trusted any more if the difference is greater than 2AL.

The protection level supervision sub function is explainable and simpler than the along-track position estimation using track constrained UKF sub function. The verification of this function is straight forward and does not require significant statistical effort.

The proposed method relies upon an along-track position estimate using a track constrained UKF subfunction, such as 110 in FIG. 1, in which the primary sensor, such as 114 in FIG. 1, is a low-cost commercial off-the-shelf IMU with multiple sources of measurement updates (i.e. speed and position). A less dense landmark installation is required in comparison with existing technologies. For example, with traditional technologies landmarks are installed every 25 m to 150 m. The vehicle positioning system and method functions safely with a distance between landmarks greater than one km, so landmarks need be installed only at platform areas and switch zones.

The vehicle positioning system and method significantly reduces the system life cycle cost in terms of equipment cost, installation time and cost, maintenance cost, and provides a higher system reliability and availability.

The bound of the position uncertainty of the along-track position estimate derived using a track constrained UKF may not be possible to prove/demonstrate. This is recoverable and become an advantage because the position uncertainty bound is proved and demonstrated by using supervisory protection subfunctions including protection level subfunction such as 126 in FIG. 1 and protection level supervision subfunction such as 130 in FIG. 1.

The along-track position estimate using track constrained UKF sub function, which is complex, may be developed according to SIL 0 development process and reside within a SIL 0 computing platform, not within the SIL 4 computing platform. This will save non-recurring engineering cost both in the software development and safety case domains.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of supervising positioning of a vehicle along a guideway, comprising a supervisory controller, first and second controllers communicatively connected with the supervisory controller, a first inertial measurement unit communicatively connected with the first controller, and a second inertial measurement unit communicatively connected with the second controller, a first speed measurement sensor communicatively connected with the first controller and a second speed measurement sensor communicatively connected with the second controller, the method comprising:

receiving, by the first controller, first speed measurements from the first speed measurement sensor, first motion measurements from the first inertial measurement unit, first position data and first-position precision data from a localization sensor and support points from a database;

receiving, by the second controller, second speed measurements from the second speed measurement sensor, second motion measurements from the second inertial measurement unit, second-position data and second position precision data from the localization sensor and the support points from the database;

estimating, by the first controller, first along-track vehicle positions using first track constrained unscented Kalman filter functions based on the first received speed measurements, first motion measurements, the first-position data, the first-position precision data, and the support points;

estimating, by the second controller, second along-track vehicle positions using second track constrained unscented Kalman filter functions based on the second received speed measurements, second motion measurements, the second-position data, the second position precision data, and the support points;

executing protection level and protection level supervision functions on the supervisory controller to validate the first along-track position estimates and second along-track position estimates using a Stanford diagram verification technique and affinity between multiple along-track vehicle position estimates, wherein the first controller and the second controller are executed on computing platforms having a different safety integrity level (SIL) level than the supervisory controller, and the first along-track vehicle position estimates and the second along-track vehicle position estimates are time-stamped; and operating the vehicle using the first along-track position estimate if the first and second along-track position estimates are validated.

2. The method of claim 1, wherein the unscented Kalman filter function estimates the first and the second along-track vehicle positions based on a position determination from a localization sensor.

3. The method of claim 1, wherein the unscented Kalman filter function estimates the first and the second along-track vehicle positions of based on support points from a database.

4. The method of claim 1, wherein the protection level function is based on an alarm limit value.

5. The method of claim 1, wherein the protection level function is based on an integrity risk value.

6. The method of claim 1, wherein the first and the second along-track position estimates are averaged to compute an acceptable reference position estimate.

7. A system of supervising vehicle positioning of a vehicle along a guideway, the system comprising:

a supervisory controller, first and second controllers communicatively connected with the supervisory controller, a first inertial measurement unit communicatively connected with the first controller, and a second inertial measurement unit communicatively connected with the second controller, a first speed measurement sensor communicatively connected with the first controller and a second speed measurement sensor communicatively connected with the second controller, wherein the first controller is configured to receive first speed measurements from the first speed measurement sensor, first motion measurements of the vehicle from the first inertial measurement unit, first position data and first position precision data from a localization sensor and support points from a database;

wherein the second controller is configured to receive second speed measurements from the second speed measurement sensor, second motion measurements of the vehicle from the second inertial measurement unit, the second position data and the second position precision data from the localization sensor and the support points from the database;

wherein the first controller is configured to estimate a first along-track vehicle position using track constrained unscented Kalman filter functions based on the received first speed measurements, first motion measurements, the first position data, the first position precision data, and the support points and wherein the second controller is configured to estimate a second along-track vehicle position using track constrained unscented Kalman filter functions based on the received second speed measurements, second motion measurements, the second position data, the second position precision data, and the support points;

wherein the supervisory controller is configured to execute protection level and protection level supervision functions on the supervisory controller, the protection level being verified by a Stanford diagram verification technique and the protection level being supervised by affinity between the first and the second along-track vehicle position estimates, and wherein the first controller and the second controller are executed on computing platforms having a different safety integrity level (SIL) level than the supervisory controller, and the first along-track vehicle position estimates and the second along-track vehicle position estimates are time-stamped.

8. The system of claim 7, wherein the supervisory controller is executed on a SIL 4 computing platform.

9. The system of claim 7, wherein the first and the second controllers are executed on a SIL 0 computing platform.

10. The system of claim 7, wherein the first and the second inertial measurement units provide 3-D acceleration (specific force) and 3-D angular rate measurements.

11. The system of claim 7, wherein the first and the second speed measurement sensors are radar.

12. The system of claim 7, further comprising a localization sensor communicably connected to the first and second controllers providing position and position precision to the first and second controllers.

13. The system of claim 7, further comprising a database communicably connected to the first and the second controllers, providing support points for the unscented Kalman filter functions.

14. The system of claim 7, further comprising at least two supervisory controllers wherein output of the two supervisory controllers are compared.

15. A method of supervising positioning of a vehicle along a guideway, comprising a safety integrity level (SIL) 4 computing platform executing a supervisory controller and a first controller communicatively connected with a first inertial measurement unit and a first speed measurement sensor and a second controller communicatively connected with a second inertial measurement unit and a second speed measurement sensor, the method comprising: determining, using the first controller, a first speed and a first motion direction of the vehicle;

determining, using the second controller, a second speed and a second motion direction of the vehicle;

estimating, using a first controller, a first along-track vehicle position using a track constrained unscented Kalman filter functions based on the determined first speed and first motion direction, first motion measurements from the first inertial measurement unit, and position data and position precision data from a localization sensor and support points from a database;

estimating, using a second controller, a second along-track vehicle position using a track constrained unscented Kalman filter functions based on the determined second speed and second motion direction, second motion measurements from the second inertial measurement unit, and the position data and the position precision data from a localization sensor and support points from a database;

executing protection level functions to generate protection level values and protection level supervision functions to evaluate protection level values on the supervisory controller using Stanford diagram verification technique and affinity between the first and the second along-track vehicle position estimates and validating the first and the second along-track vehicle position estimates, wherein the first controller and the second controller are executed on computing platforms having a different SIL level than the supervisory controller, and the first along-track vehicle position estimates and the second along-track vehicle position estimates are time-stamped; and operating the vehicle using the first along-track position estimate if the first and the second along-track position estimates are validated.

16. The method of claim 15, wherein the unscented Kalman filter function estimates the first and the second along-track vehicle positions based on a position determination from a localization sensor.

17. The method of claim 15, wherein the unscented Kalman filter function estimates the first and the second along-track vehicle positions based on support points from a database.

18. The method of claim 15, wherein the protection level values are based on an alarm limit value.

19. The method of claim 15, wherein the protection level values are based on an integrity risk value.

20. The method of claim 15, wherein the protection level values are evaluated by comparison to an alarm limit and position uncertainty.

* * * * *